United States Patent [19]
Ludlow et al.

[11] Patent Number: 5,412,483
[45] Date of Patent: May 2, 1995

[54] APPARATUS AND METHOD FOR MANAGING STORAGE OF PRINT-RELATED INFORMATION IN A PRINT FILE

[75] Inventors: M. John Ludlow, Geneseo; Arlene J. Buck, Webster; Joy L. Lynd, Penfield; Dragana Pavlovic; Jeffrey A. Smith, both of Rochester, all of N.Y.

[73] Assignee: Xerox Corporation, Stamford, Conn.

[21] Appl. No.: 168,836

[22] Filed: Dec. 16, 1993

[51] Int. Cl.$^6$ .............................................. H04N 1/21
[52] U.S. Cl. ................................... 358/401; 358/444; 395/115
[58] Field of Search ............... 358/404, 444, 450, 453, 358/401, 296; 395/115, 116

[56] References Cited

U.S. PATENT DOCUMENTS

| | | | |
|---|---|---|---|
| 5,084,831 | 1/1992 | Morikaw et al. | 395/116 |
| 5,108,207 | 4/1992 | Isobe et al. | 395/115 |
| 5,170,340 | 12/1992 | Prokop et al. | 364/143 |
| 5,216,754 | 6/1993 | Sathi et al. | 395/113 |

*Primary Examiner*—Scott A. Rogers
*Attorney, Agent, or Firm*—Gary B. Cohen

[57] ABSTRACT

A method of printing a job to produce a set of prints in a printing system with a print file, the print file being divided into a first buffer and a second buffer where the print file communicates with a marker. The marker employs a set of a first type of print-related information and a set of a second type of print-related information for producing the set of prints. The method includes the step of filling the first buffer with a first portion of the set of the first type of print-related information and the second buffer with the a first portion of the set of the second type of print-related information. The method further includes the step of reading, with the marker, the first portion of the set of the first type of print-related information from the first buffer and the first portion of the set of the second type of print-related information from the second buffer. When the first portion of the set of the first type of print-related information has been read by the marker, the first buffer is filled with a second portion of the set of the first type of print-related information.

28 Claims, 16 Drawing Sheets

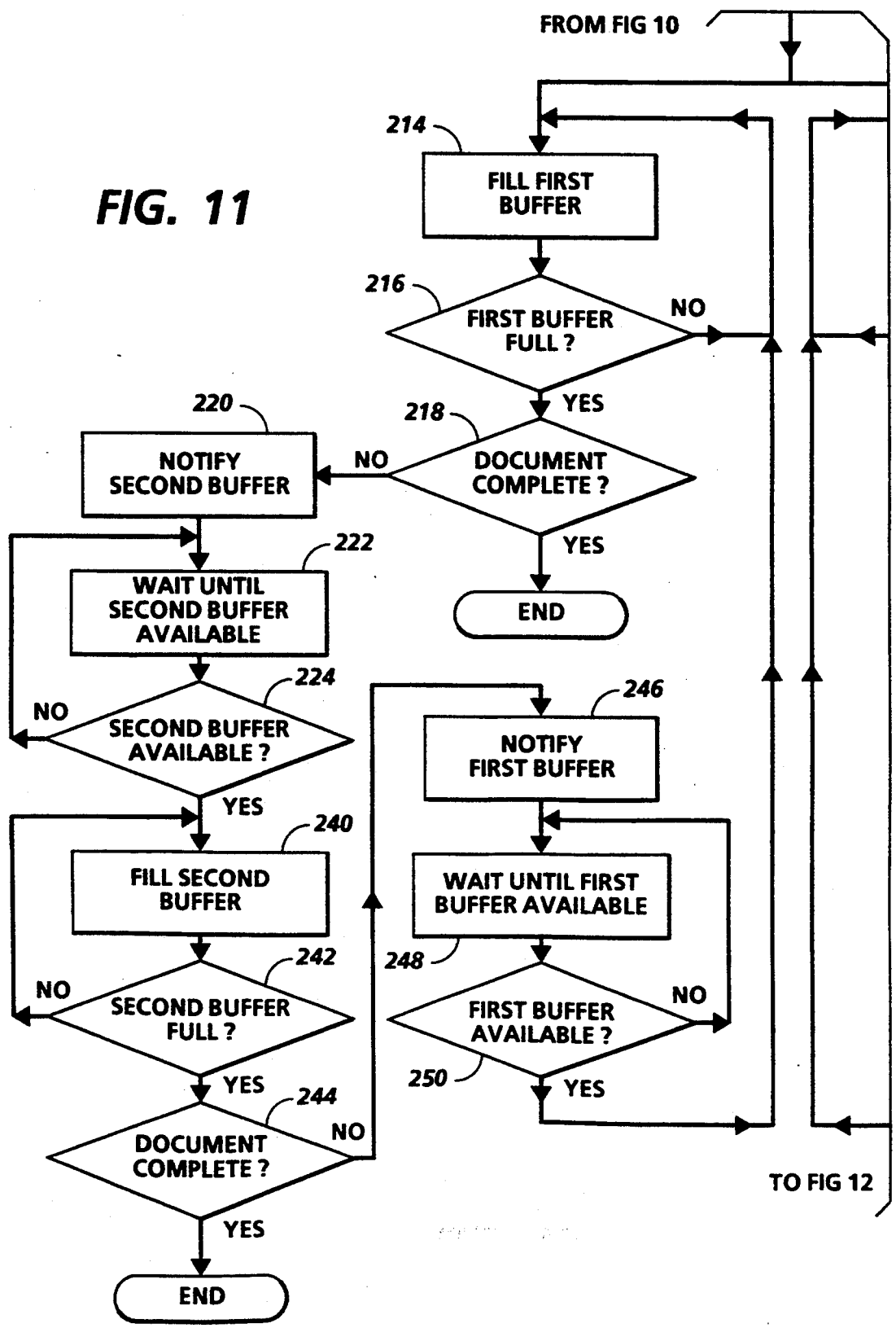

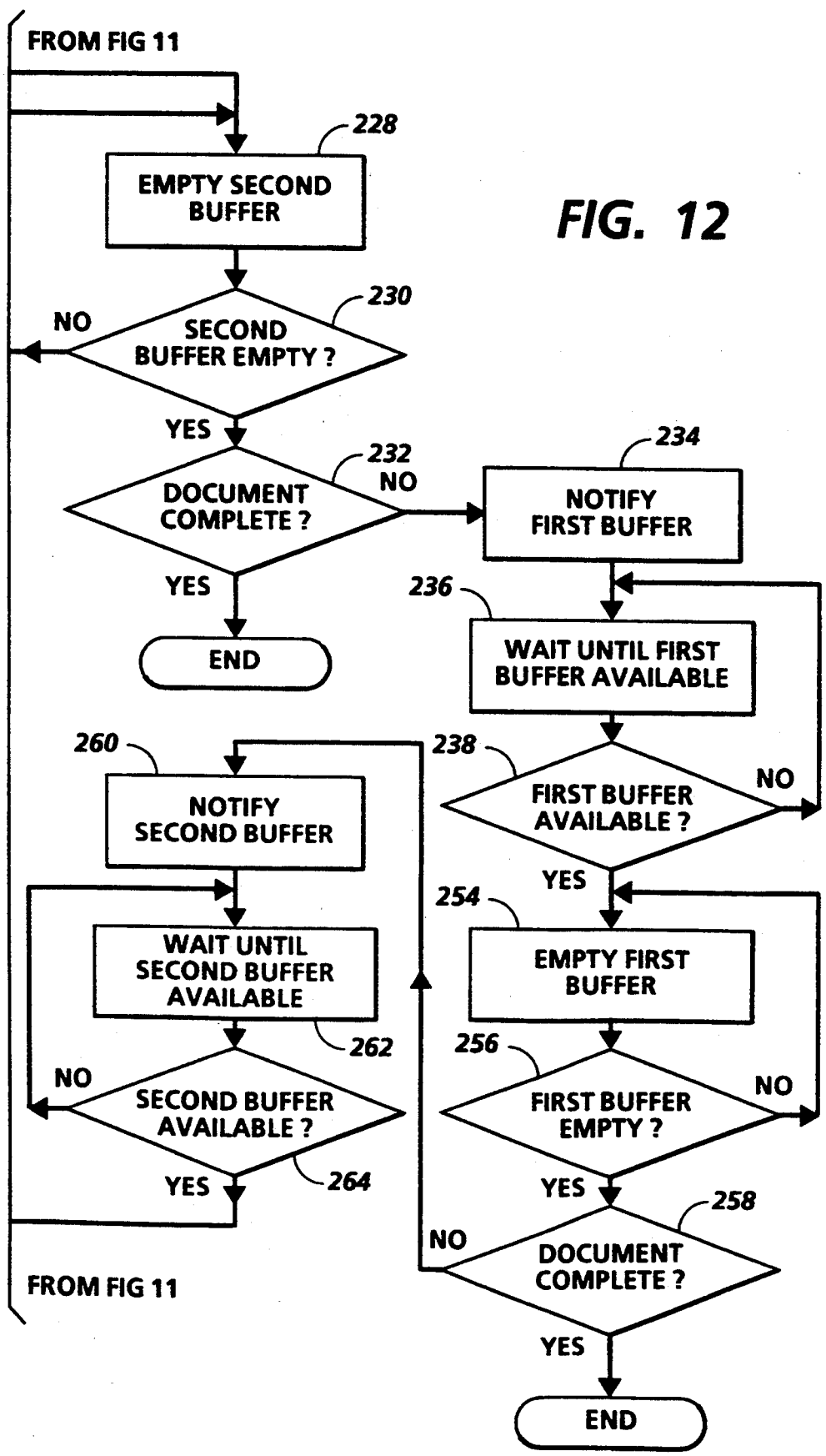

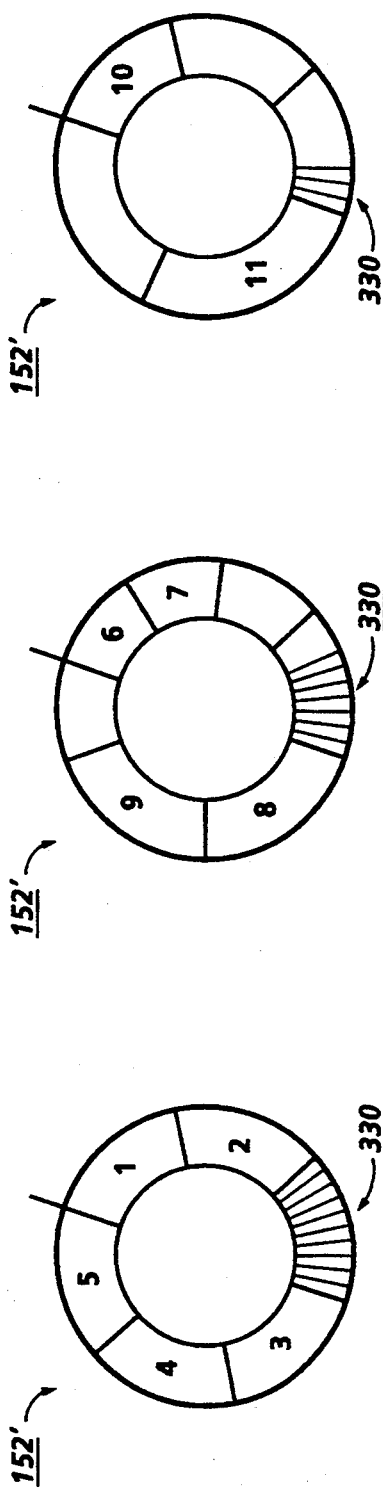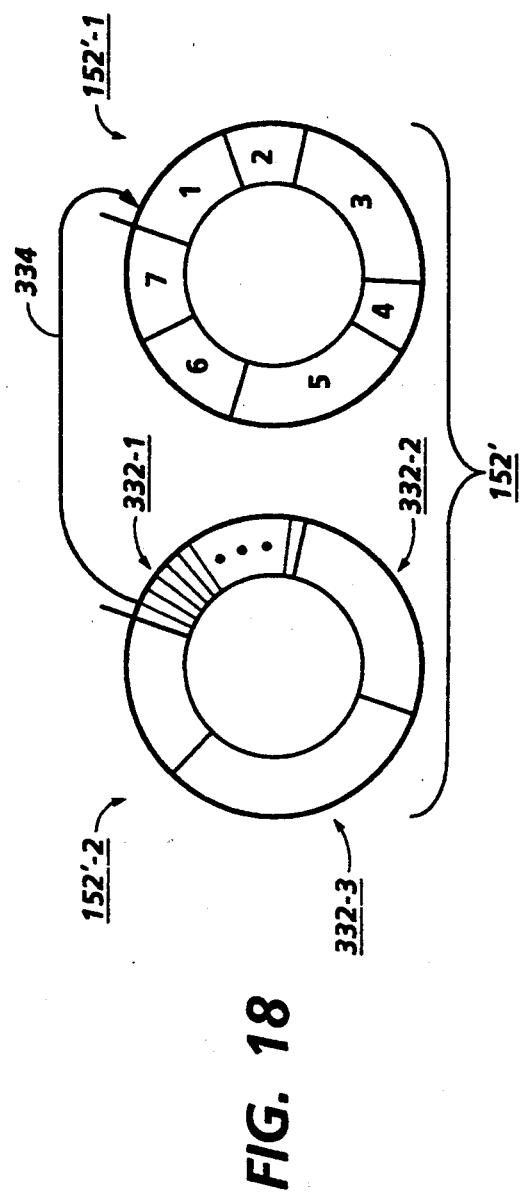

APPARATUS AND METHOD FOR MANAGING STORAGE OF PRINT-RELATED INFORMATION IN A PRINT FILE

The present invention relates generally to a technique for printing a print job and, more particularly, to a method for handling a relatively oversized job with a "racetrack" buffer arrangement or a two buffer print file.

Electronic printing systems rasterize, or generate in digital form, page images prior to transfer to an image output terminal for printing. The rasterization process can be performed in any of a variety of different manners. One rasterization process, for example, comprises the decompression of a simple image received from an associated scanner. A more complicated rasterization process comprises rasterization of some intermediate format, i.e. a page description language ("PDL") generally associated with receipt of image information from a networked workstation. For compactness, the PDL contains commands describing the line segments, curves, characteristics, images, etc. which must be combined to create a desired page image. Electronic printing systems rasterize the PDL prior to printing. This rasterization is commonly performed in real-time as the page image is transferred for a processing operation.

An advantageous feature of some electronic printing systems resides in the ability to capture a job once and thereafter print it on demand. An implementation possessing such capability is disclosed in the following patent, the pertinent portions of which are incorporated herein:

U.S. Pat. No. 5,170,340
Patentees: Prokop et al.
Issued: Dec. 8, 1992

As shown in FIG. 9 of U.S. Pat. No. 5,170,340, the post parse service ("postparser") communicates with the disk memory, the disk storing decomposed/decompressed image data required to print pages of stored print jobs. In operation, a print job is processed, for printing, by passing certain information, for each page of the print job, from the postparser to the print file. For one example, the information, for each page, includes a page description entry ("PDE"), which describes how the image of the page is to be placed on a print media sheet, and a page image descriptor ("PID"), which includes a "bandslist" (i.e. a designator of the disk location(s) of the image data for the image of the page) and suitable page commands. In one mode of operation the PDEs and PIDs for the print job are written to the print file, and read by the marker. In accordance with the information read by the marker, it performs appropriate image generating processes, e.g. accessing/reading image data stored out to disk and implementing instructions provided via the PDEs and PIDs. For a situation requiring the printing of multiple sets, the print-related information of the print file is read repetitively by the marker to generate as many sets as designated by a program of the print job.

In an exemplary electronic printing system, with memory, the amount of memory allocated to the print file can be consumed when the job exceeds a given size, i.e. when only a portion of the job format can written to the print file. As follows from the following patent, the pertinent portions of which are incorporated herein, the size of a job is affected by, among other factors, the complexity of the pages associated therewith:

U.S. Pat. No. 5,216,754
Patentees: Sathi et al.
Issued: Jun. 1, 1993

Accordingly, the existence of one or more relatively complex pages in a job can have a profound effect on the size of the job. Thus, even a relatively small job, in terms of actual document pages, can cause the memory limit of the print file to be exceeded when selected ones of the corresponding document pages are relatively complex.

In the above-mentioned exemplary electronic printing system, when the print file becomes saturated with the format information for a relatively complex job (referred to hereinafter as "complex job format"), one of two courses can be taken. With one course, marking of the complex job is simply aborted and the corresponding job document is printed in segments. This is undesirable since printing in segments requires offline collation which, for multiple sets with considerable pages, can result in considerable inconvenience to an operator. With another course, the printing of the complex job is suspended and further memory space is sought by consuming unrelated print-related information residing in the print file. In one example, such consumption is achieved by marking the format information for one or more jobs that reside in the print file coincidentally with the complex job format. If all of the format information for the complex job cannot be written to the print file prior to printing the other jobs, then the job is aborted and printed in segments, as described above. Neither of these courses represents a fully satisfying approach for jobs whose format information cannot be "squeezed" into the print file. Thus, it would be desirable to provide a technique that allows a complex, relatively oversized job to be printed automatically with a minimum amount of inconvenience to the operator.

In accordance with one disclosed aspect of the present invention there is provided a method of printing a job to produce a set of prints in a printing system with a print file, the print file being divided into a first buffer and a second buffer where the print file communicates with a marker, the marker employing a set of a first type of print-related information and a set of a second type of print-related information for facilitating the production of the set of prints, including the steps of: filling the first buffer with a first portion of the set of the first type of print-related information and the second buffer with the first portion of the set of the second type of print-related information; reading, with the marker, the first portion of the set of the first type of print-related information from the first buffer and the first portion of the set of the second type of print-related information from the second buffer; and filling the first buffer with a second portion of the set of the first type of print-related information when all of the first portion of the set of the first type of print-related information has been read by the marker.

In another disclosed aspect of the invention, there is provided a method of printing a job to produce a set of prints in a printing system with a print file and a marker, the print file receiving a set of print-related information from a print-related information generating source for facilitating the production of the set of prints with the marker, including the steps of: filling a first portion of the print file with a first portion of the set of print-related information; reading the first portion of the print-related information; filling a second portion of the print file with a second portion of the set of print-related information while the first portion of the set of print-related information is being read; determining, on completion of said reading step, whether said second portion filling step is complete; and inhibiting operation of the marker when it is determined that said second portion filling step is incomplete, These and other aspects of the invention will become apparent from the following description, the description being used to illustrate a preferred embodiment of the invention when read in conjunction with the accompanying drawings.

Figure 2:
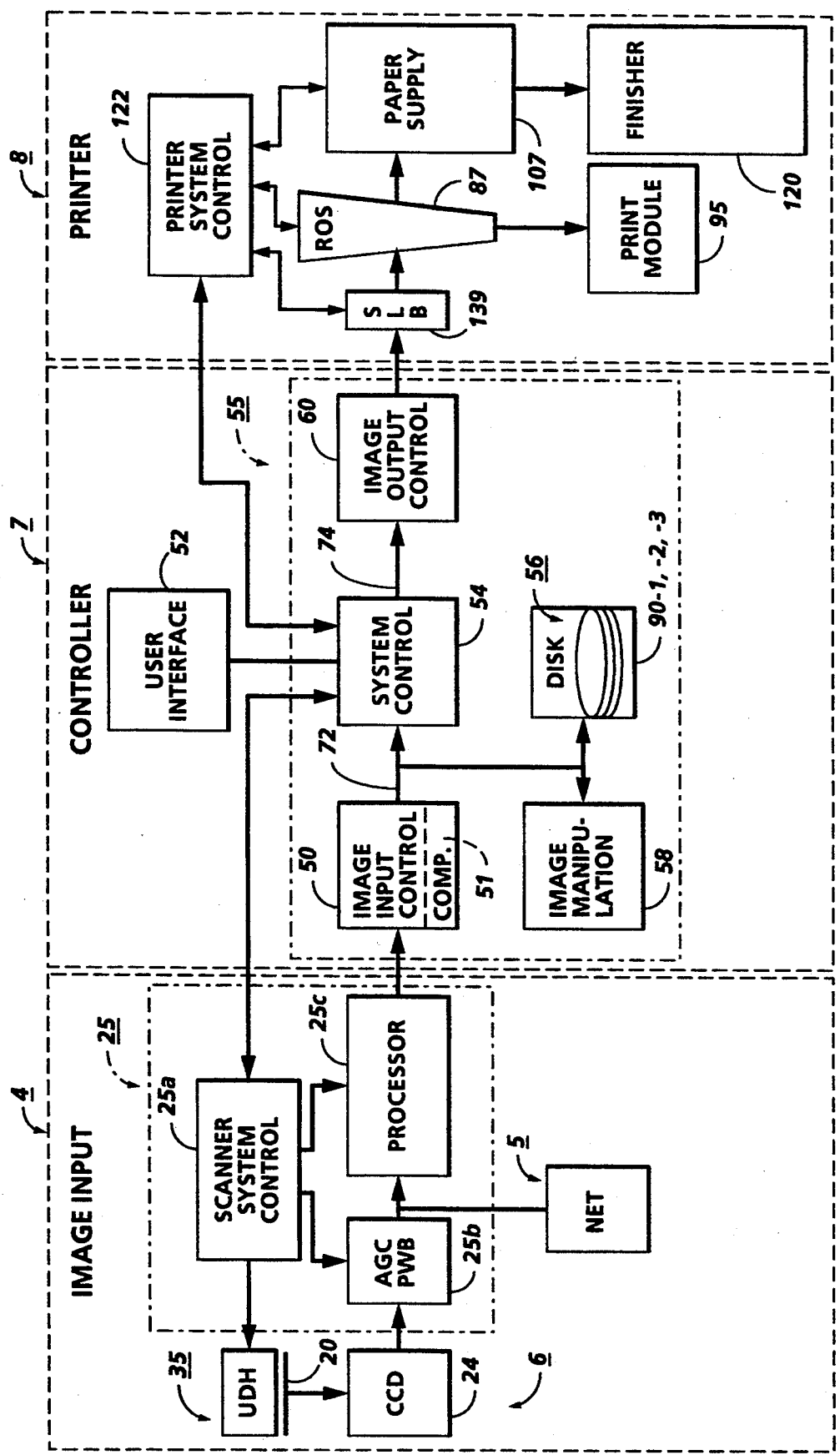
FIG. 2 is a block diagram depicting the major elements of the printing system shown in FIG. 1.
Figure 3:
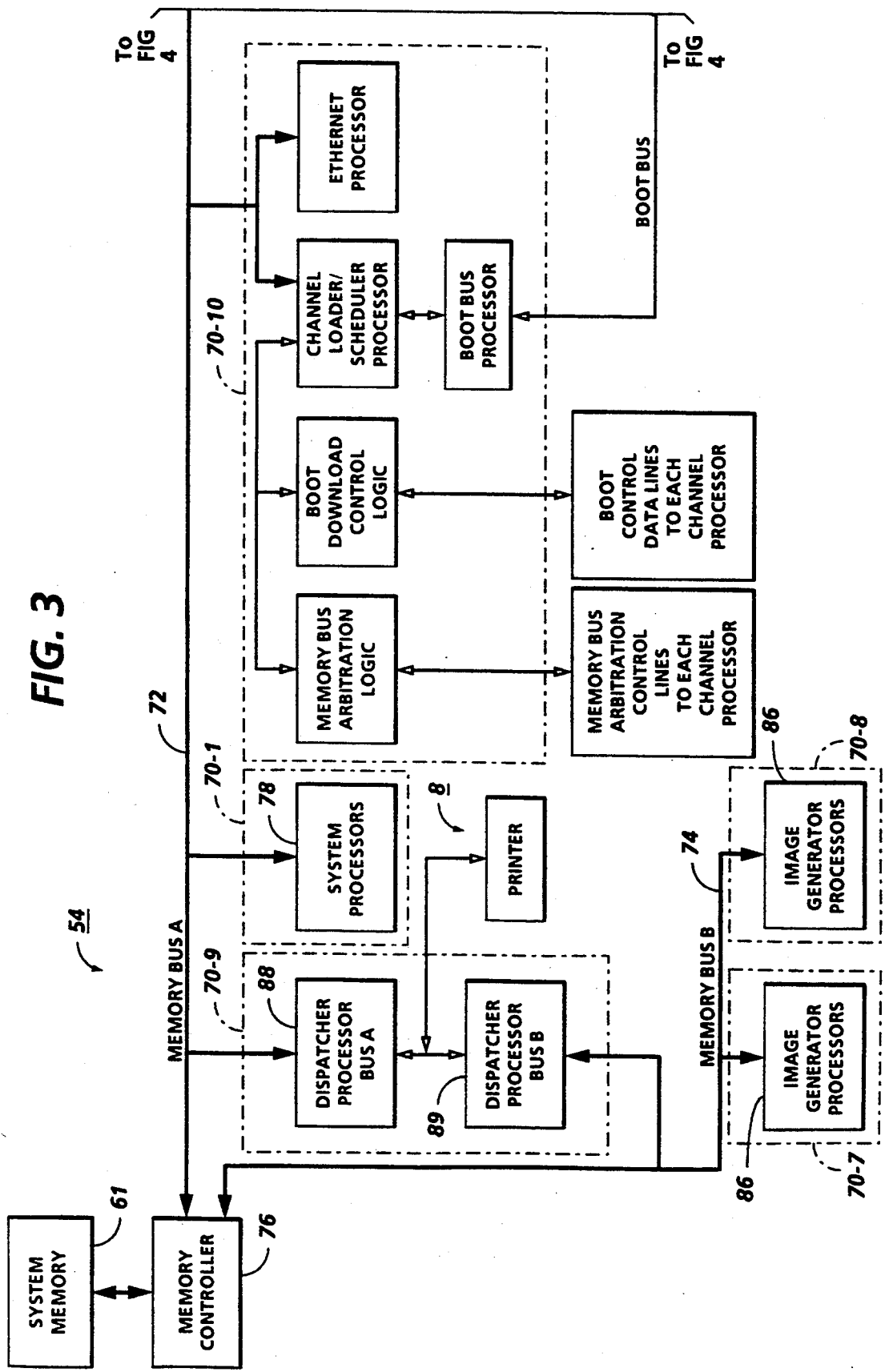
Figure 4:
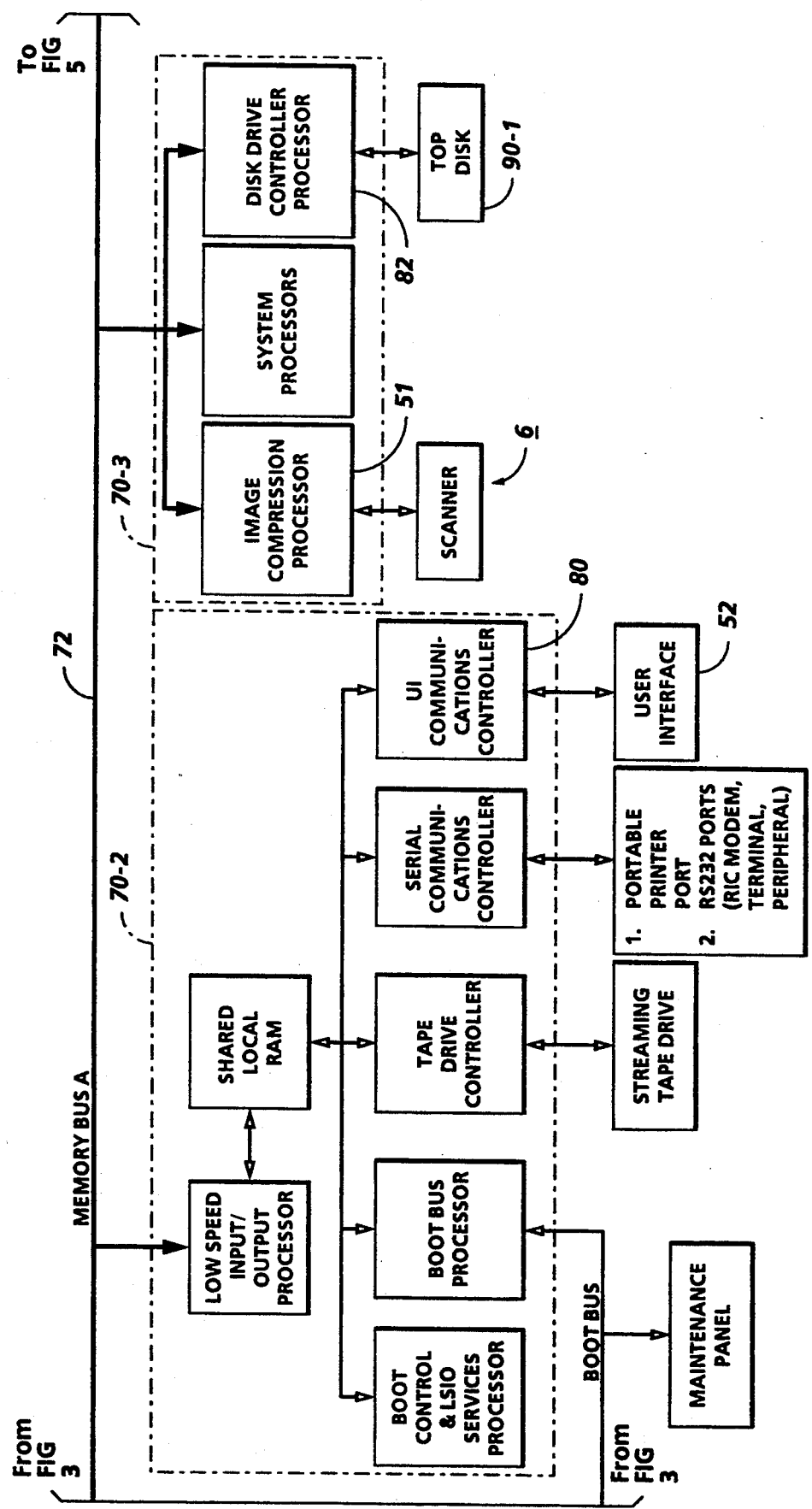
Figure 5:
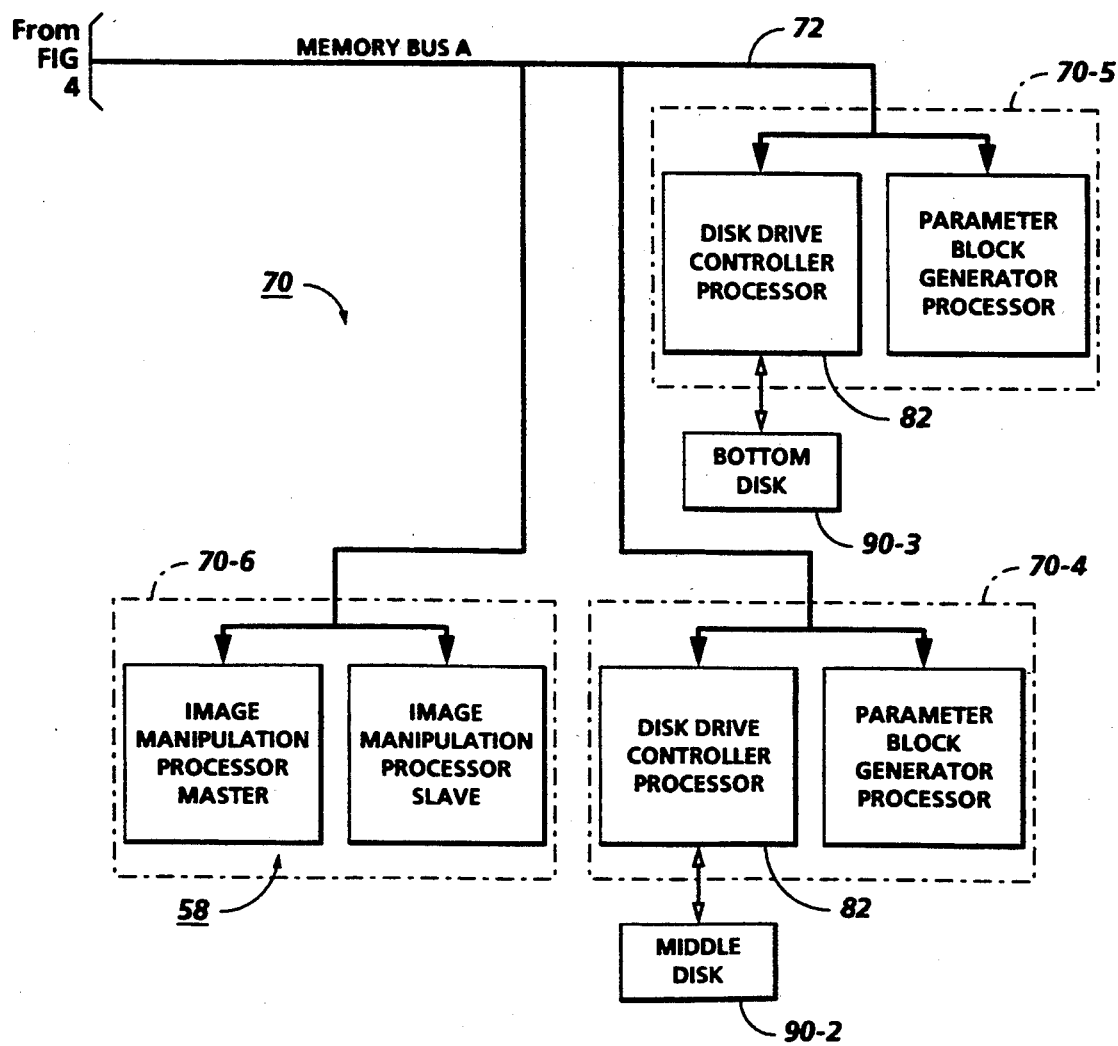
Figure 6:
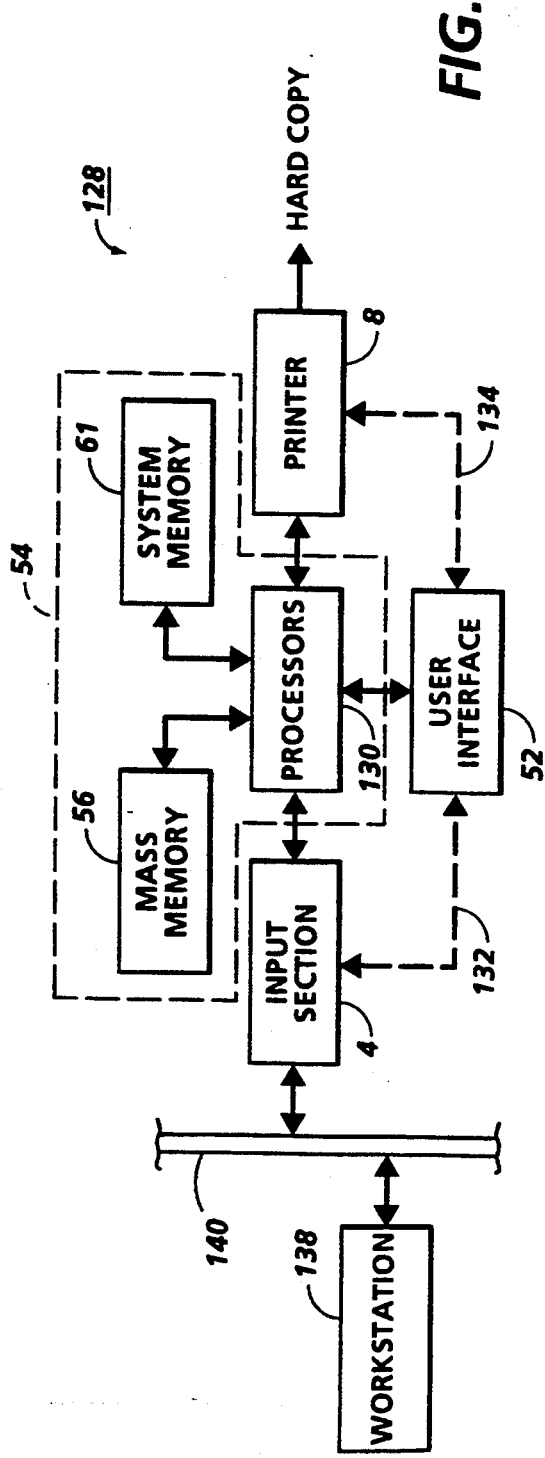
Figure 7:
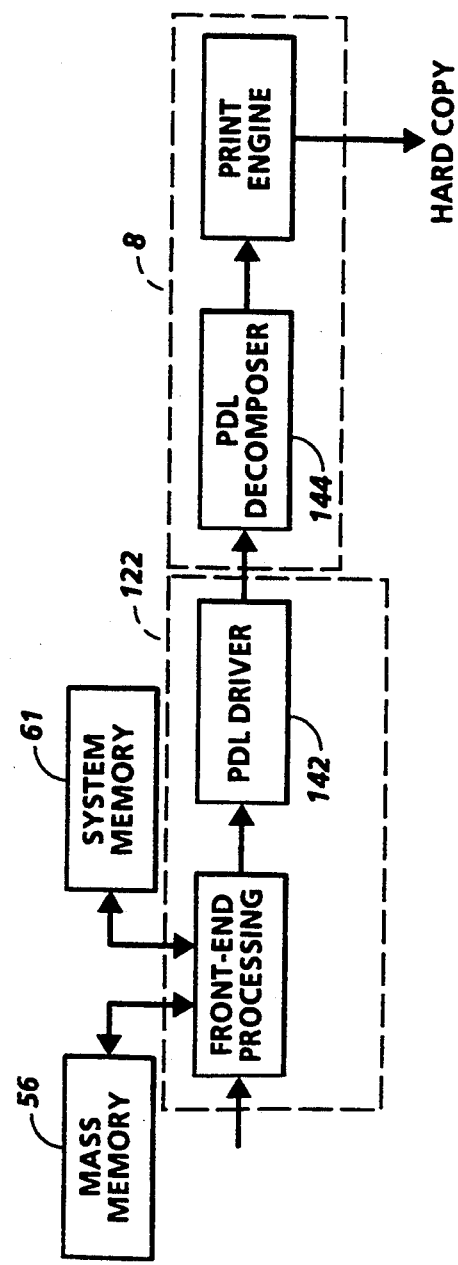
Figure 8:
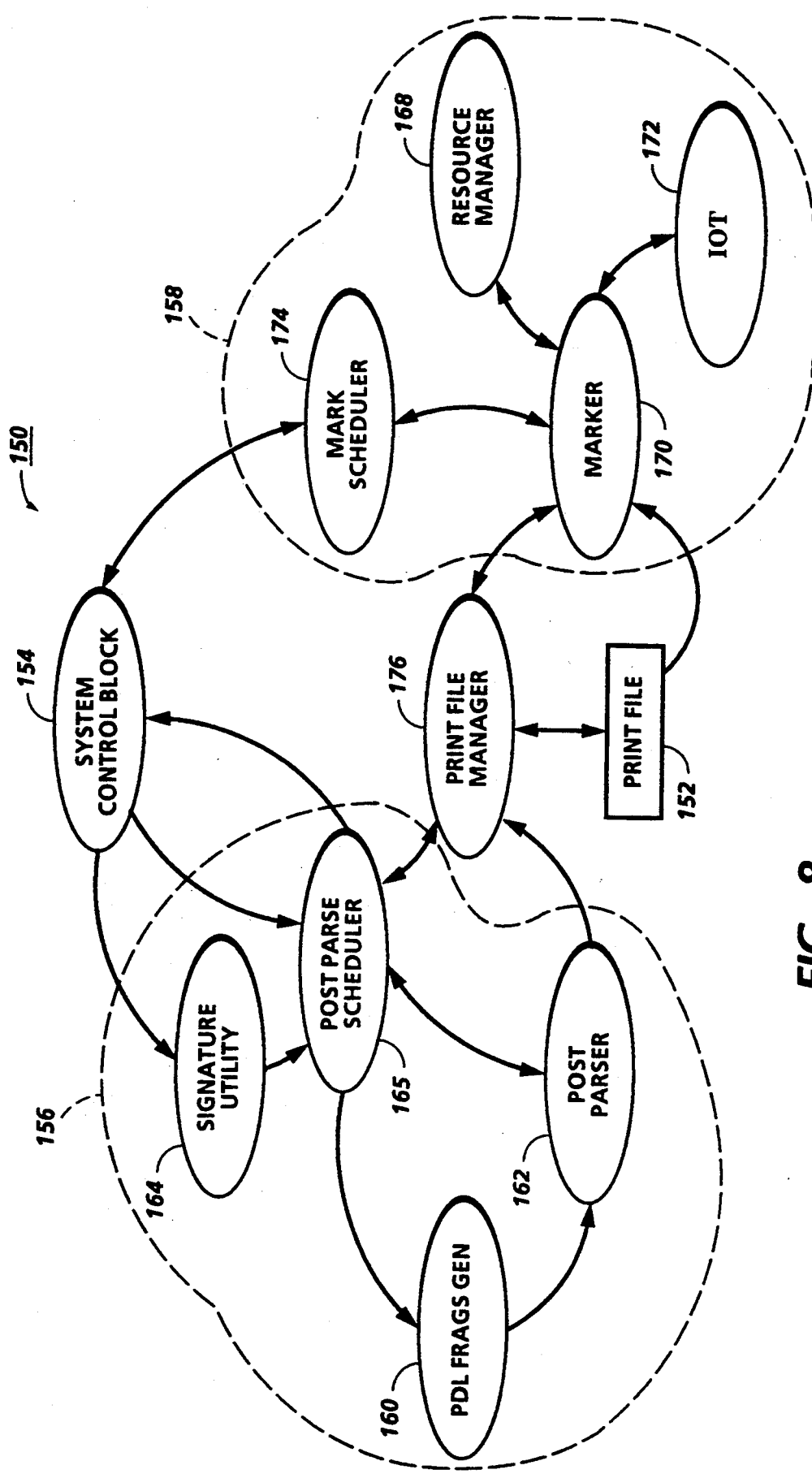
Figure 9A:
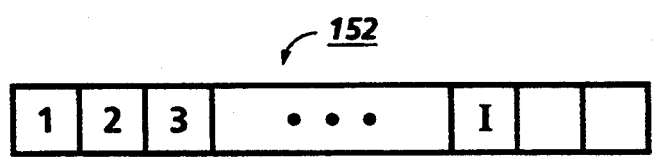
Figure 9B:
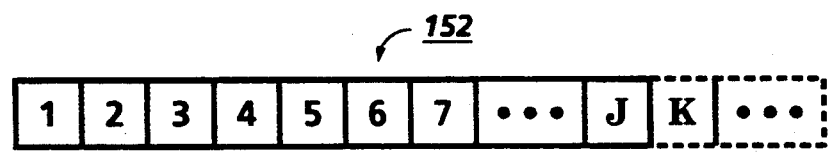
Figure 9C:
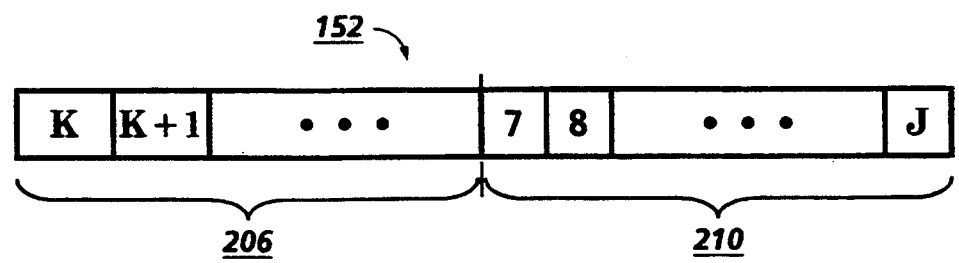
Figure 10:
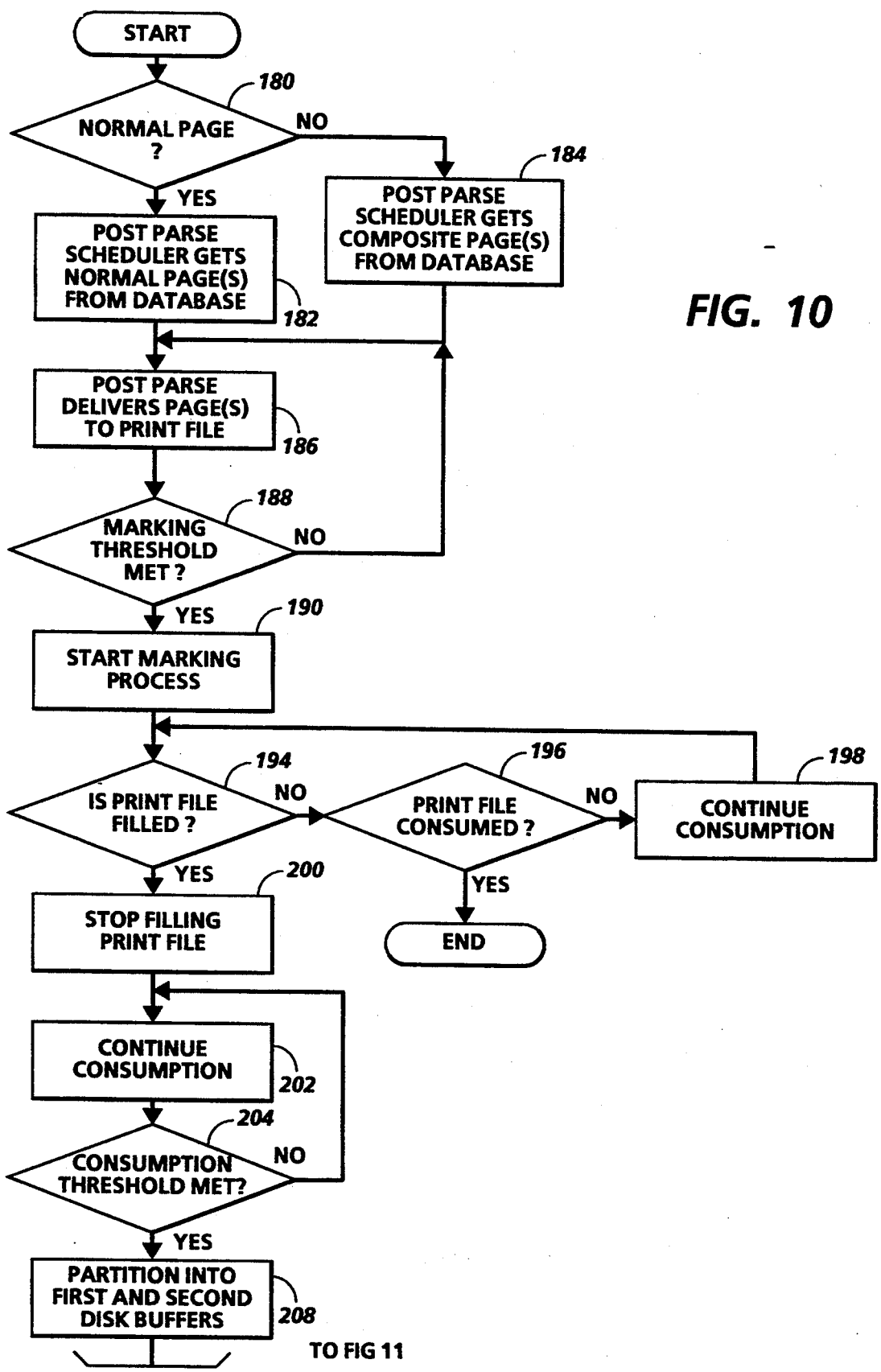
Figure 13A:
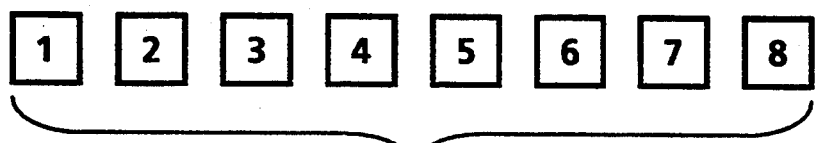
Figure 13B:
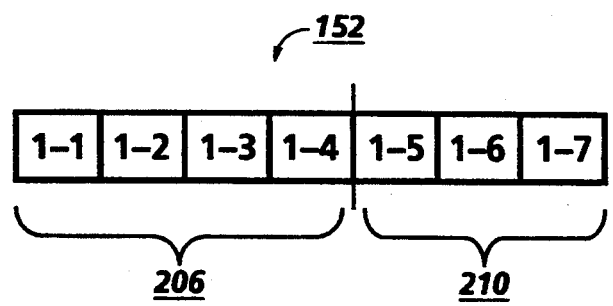
Figure 13C:
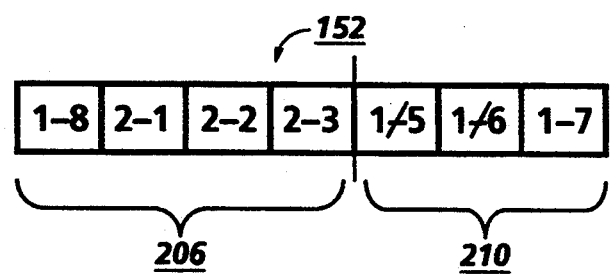
Figure 13D:
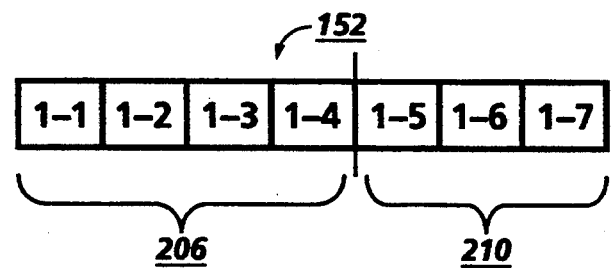
Figure 14:
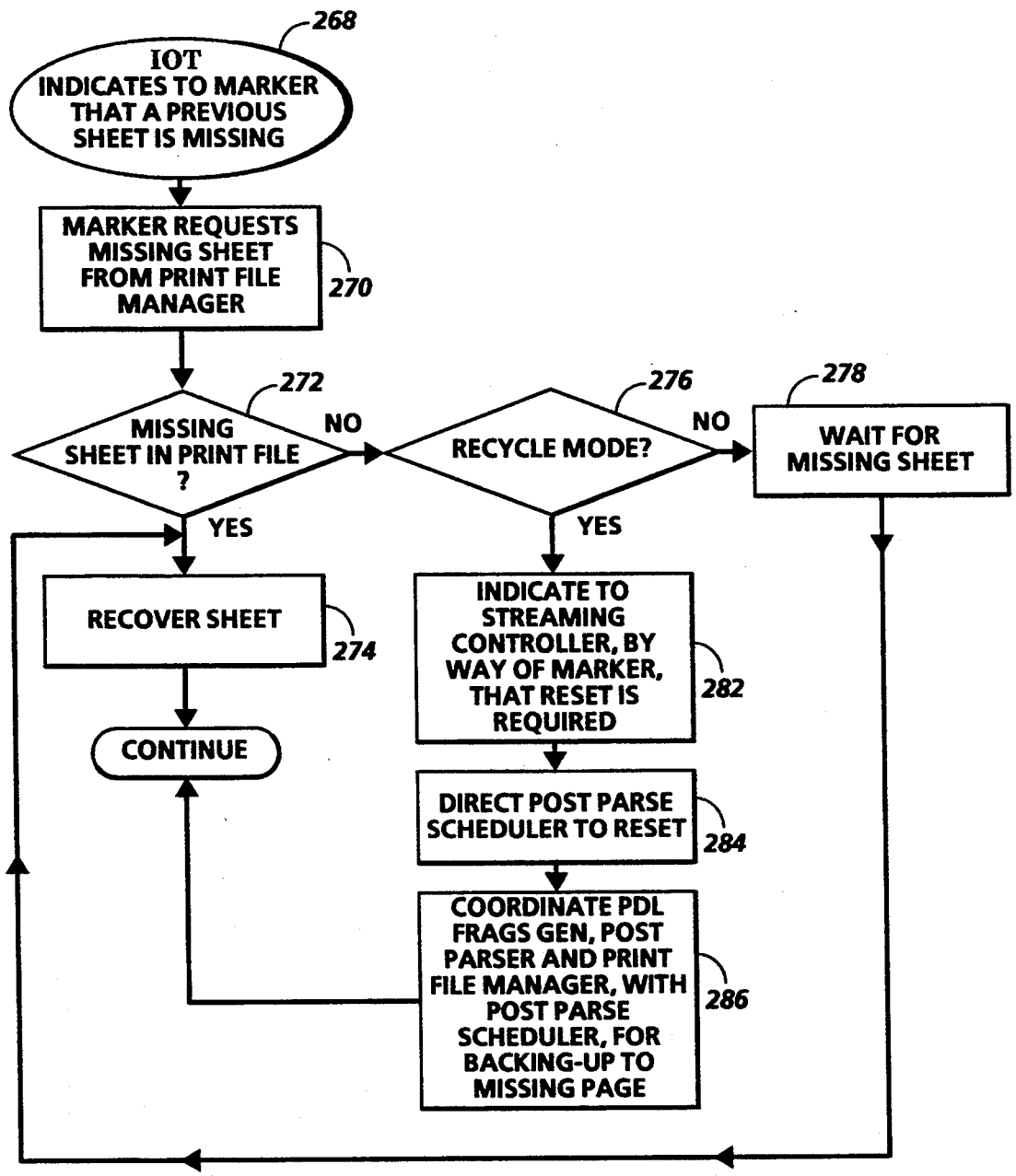
Figure 15A:
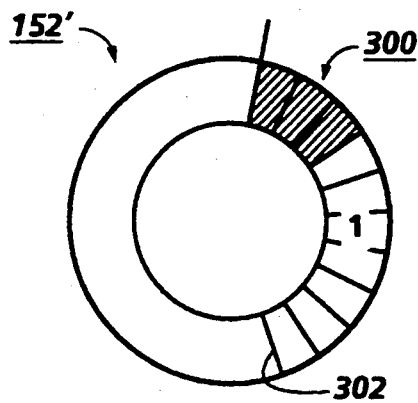
Figure 15B:
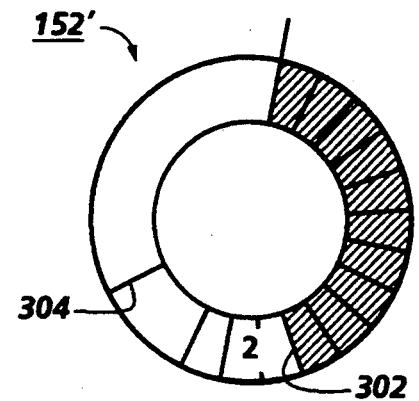
Figure 15C:
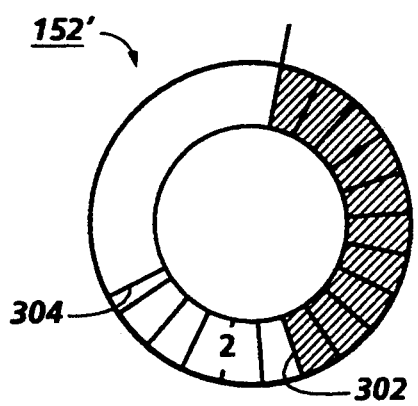
Figure 15D:
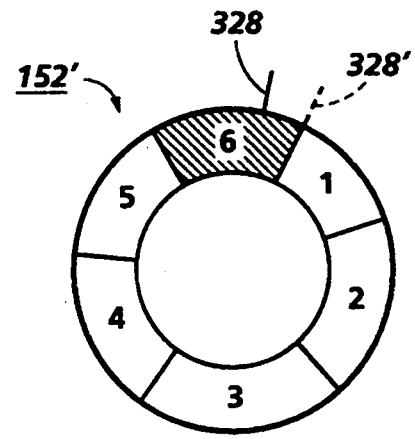
Figure 16:
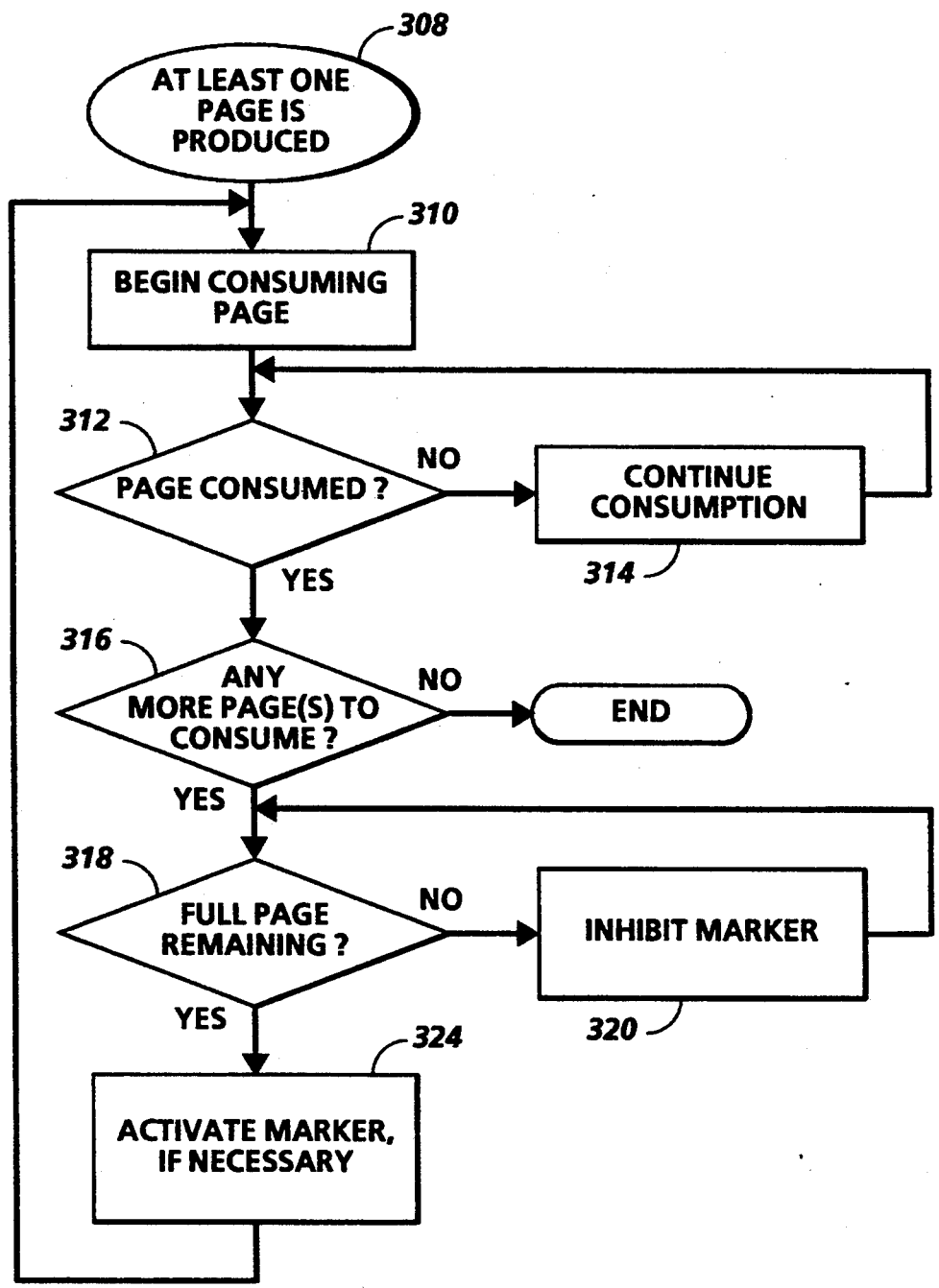

FIGS. 3–5 comprise a schematic block diagram showing the major parts of the control section for the printing system shown in FIG. 2;

FIG. 6 is a schematic, block diagrammatic view of a network printing system in which the present invention can be carried out;

FIG. 7 is a schematic, block diagrammatic view of a processor/printer interface for the printing system shown in FIG. 6;

FIG. 8 is a schematic view of a print subsystem for the printing system of FIG. 2 of FIG. 6;

FIG. 9A is a schematic view of a print file being operated in a performance mode;

FIG. 9B is a schematic view of the print file filled to capacity with image-related data;

FIG. 9C is a schematic view of the print file partitioned in conformance with a preferred operational mode of the present invention;

FIGS. 10–12 conjunctively represent a flow diagram directed toward a technique for operating the print file in a first mode and a second mode;

FIG. 13A is a schematic view of eight pages of image related data intended for use in marking an eight page print job;

FIG. 13B is a schematic view of a print file, partitioned in accordance with the technique of FIGS. 10–12, with seven of the eight pages from FIG. 13A written therein;

FIG. 13C is a schematic view of the print file of FIG. 13B with part of the print file being overwritten with image-related data from a second set of image-related data and another part of the print file being read by the marker;

FIG. 13D is a schematic view of the print file of FIG. 13C after a preferred reset procedure has been applied thereto;

FIG. 14 is a flow diagram depicting the preferred reset procedure;

FIGS. 15A–15D, respectively, represent schematic views of circular print files with each print file depicting a relationship between produced and consumed print-related information;

FIG. 16 is a flow diagram depicting a preferred mode of operating the print files of FIGS. 15A–15D;

FIGS. 17A–17C, respectively, represent schematic views of a print job being processed in the print file by way of a recycle mode; and FIG. 18 is a schematic view of a two buffer print file implemented in conformance with a preferred mode of the present invention.

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
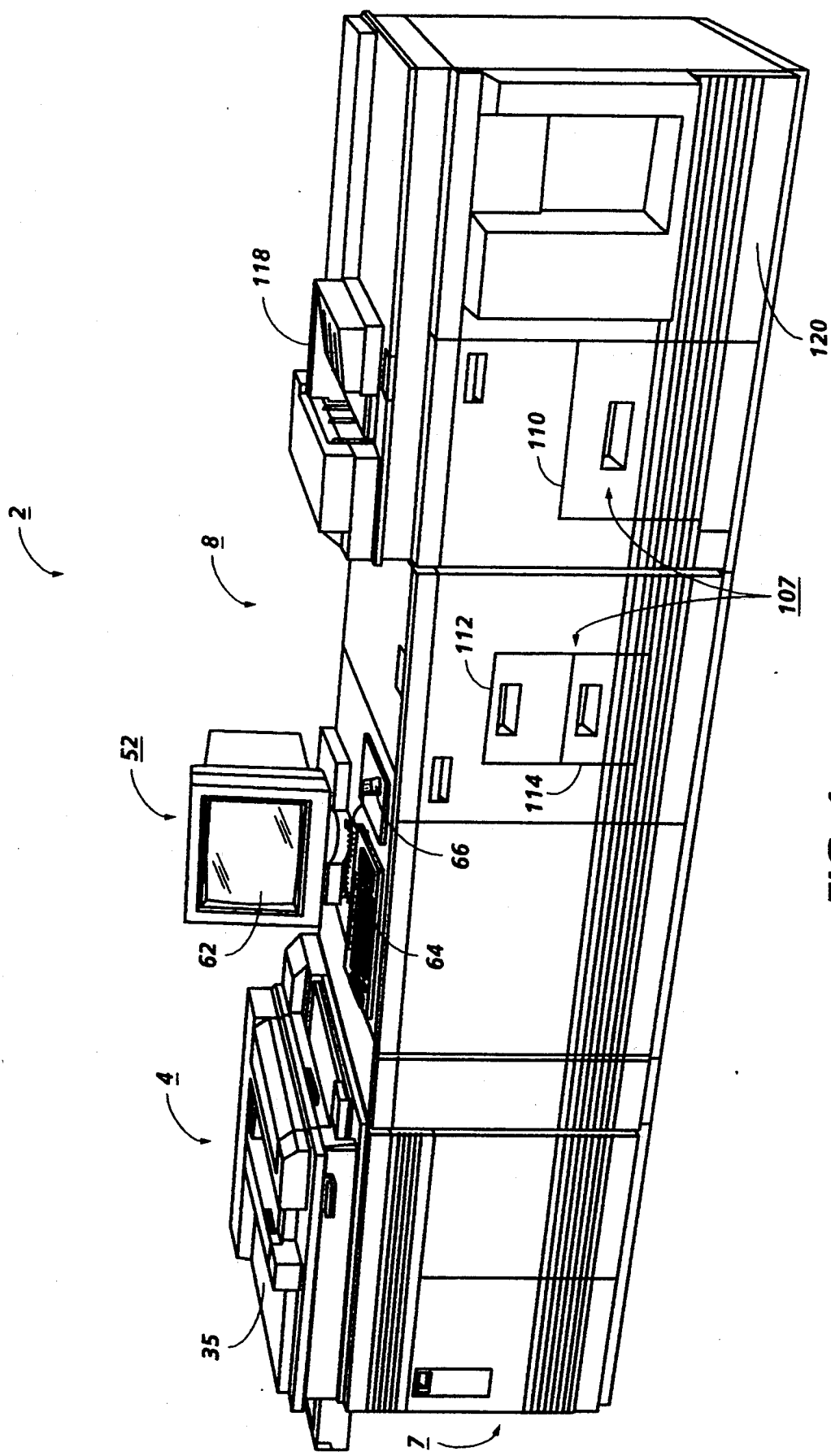
FIG. 1 is a view depicting an electronic printing system of the type adapted to implement the printing technique of the present invention.

Referring to the drawings where like reference numerals designate identical or corresponding parts throughout the several views, and more particularly to FIGS. 1 and 2, there is shown an exemplary image printing system 2 for processing print jobs in accordance with the teachings of the present invention. Printing system 2, for purposes of explanation, is divided into image input section 4, controller section 7, and printer section 8. In the example shown, the image input section 4 has both remote and on-site image inputs, enabling system 2 to provide network, scan, and print services. Other system combinations may be envisioned such as a stand alone printing system with on-site image input (i.e., a scanner), controller, and printer; a network printing system with remote input, controller, and printer; etc.

While a specific printing system is shown and described, the present invention may be used with other types of printing systems. For example, printer section 8 may instead use a different printer type such as ink jet, ionographic, thermal, photographic, etc., and, furthermore, may be incorporated in electronic display systems, such as CRTs, LCDs, LEDs, etc. or else other image scanning/processing/recording systems, or else other signal transmitting/receiving, recording systems, etc. as well.

For off-site image input, image input section 4 has a network 5 with a suitable communication channel such as an EtherNet ® connection enabling image data in the form of image signals or pixels from one or more remote sources to be input to system 2 for processing. Where the Page Description Language (PDL) of the incoming imaging data is different than the PDL used by system 2, suitable conversion means (not shown) are provided. Other remote sources of image data such as streaming tape, floppy disk, video camera, etc. may be envisioned.

For on-site image input, section 4 (FIG. 2) has a document scanner section 6 with a Universal Document Handler (UDH) 35 for the purpose of automatically and sequentially placing and locating sets of multiple documents for scanning. Scanner section 6 incorporates one or more linear light sensitive arrays 24 for reciprocating scanning movement below platen 20 and focused on a line-like segment of platen 20 and the document being scanned thereon. Array 24, which may utilize Charge-Coupled Device (CCD) technology or the like, provides image elemental signals or pixels representative of the image scanned which are input to processor 25 for processing.

Processor 25 communicates with the controller section 7 and includes a scanner system control 25a, an automatic gain control printing wiring board (AGCPWB) 25b, and a processor 25c. AGCPWB 25b converts the analog image signals output by array 24 to digitally represented facsimile signals and processor 25c processes the digital image signals as required to enable controller section 7 to store and handle the image in the form and order required to carry out the job programmed. After processing, the image signals are output to controller section 7. Image signals derived from net 5 are similarly input to processor 25c.

Processor 25c also provides enhancements and changes to the image signals such as filtering, thresholding, screening, cropping, scaling (reduction/enlargement), etc. Following any changes and adjustments in the job program which affect these image processing parameters, the document must be rescanned to capture the specified modification.

Printer section 8 comprises a laser type printer having a Raster Output Scanner (ROS) 87, Print Module 95, Paper Supply 107, Finisher 120, and Printer System Control 122. ROS 87 has a two beam laser with the beams modulated in accordance with the content of an image signal input by acousto-optic modulator to provide dual imaging beams which are scanned across a moving photoreceptor of Print Module 95 by means of a rotating polygon. A detailed description of a print engine suitable for use with the present disclosed preferred embodiment is discussed in U.S. Pat. No. 5,170,340. It will be appreciated by those skilled in the art that other print engines, besides a laser-based print engine, could be used to implement the preferred embodiment of the present disclosure without affecting the concept upon which such disclosure is based. This exposes two image lines on the photoreceptor with each scan to create the latent electrostatic images represented by the image signal input to the modulator.

The latent electrostatic images are developed and transferred to a print media delivered by paper supply 107. As will be appreciated by those skilled in the art, print media can comprise a selected one of various known substrates which are capable of accepting an image, such substrates including transparencies, preprinted sheets, vellum, glossy covered stock, film or the like. The print media may comprise any of a variety of sheet sizes, types, and colors, and for this, plural media supply trays 110, 112, 114 (FIG. 1) are provided. The transferred image is permanently fixed or fused and the resulting prints discharged to either output tray 118 (FIG. 1), or to finisher 120. Finisher 120 provides certain finishing selections such as a stitcher for stitching or stapling the prints together to form books, a thermal binder for adhesively binding the prints into books, and/or other finishing options such as slitting, perforating, saddle stitching, folding, trimming, or the like.

Printer system control 122 (FIG. 2) automatically and precisely controls all the printer functions and operations in accordance with job program parameters received from system control 54 of controller section 7, as well as from internally derived signals from sensors and processes within the printer section 8. Printer system control signals are derived and distributed via a plurality of printed wiring boards (PWBs) in a multi-processor architecture characterized by multiple microprocessor controller cores, serially interconnected, and also serially linked to more numerous input/output processing circuit PWBs. Controller section 7 is, for explanation purposes, divided into an image input control 50, User Interface (UI) 52, system control 54, main memory 56, image manipulation section 58, and image output control 60. The units 50, 54, 56, 58, 60 comprise a system which may also generally be referred to as the "Electronic Subsystem" (ESS).

The scanned image data input from processor 25c of scanner section 6 to controller section 7 is compressed by image compressor/processor 51 of image input control 50 and placed in an image file. Image files, which represent different print jobs, are temporarily stored in system memory 61 (seen in FIG. 3) pending transfer to main memory 56 where the data is held pending use.

Referring again to FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, and to obtain system operating information, visual document facsimile display, programming information and icons, diagnostic information and pictorial views, etc. Items displayed on touchscreen 62 such as files and icons are actuated by either touching the displayed item on screen 62 with a finger, or by using mouse 66 to point a cursor (not shown) to the item selected and keying the mouse.

Main memory 56 (FIG. 2) has plural hard disks 90-1, 90-2, 90-3 for storing machine Operating System software, machine operating data, and the scanned image data currently being processed. When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 where the additional processing steps such as collation, make ready (document editing), decomposition, rotation, etc., are carried out. Following processing, the data may be returned to main memory 56, sent to UI 52 for display on touchscreen 62, or sent to image output control 60.

Referring particularly to FIGS. 3–5, image data output to image output control 60 is decompressed and readied for printing by image generating processors 86 of PWBs 70-7, 70-8. Following this, the data is output by dispatch processors 88, 89 on PWB 70-9 via Scan Line Buffer (SLB) 139 (FIG. 2) to printer section 8. Image data sent to printer section 8 for printing is normally purged from memory 56 to make room for new image data.

Control section 7 includes a plurality of Printed Wiring Boards (PWBs) 70 (FIGS. 3–5), PWBs 70 being coupled with one another and with System Memory 61 by a pair of memory buses 72, 74. A memory controller 76 couples System Memory 61 with buses 72, 74. PWBs 70 include system processor PWB 70-1 having plural system processors 78; low speed I/O processor PWB 70-2 having UI communication controller 80 for transmitting data to and from UI 52; PWBs 70-3, 70-4, 70-5 having disk drive controller/processor 82 for transmitting data to and from disks 90-1, 90-2, 90-3, respectively, of main memory 56 (image compressor/processor 51 for compressing the image data is on PWB 70-3); image manipulation PWB 70-6 with image manipulation processors of image manipulation section 58; image generation processor PWBs 70-7, 70-8 with image generation processors 86 for processing the image data for printing by printer section 8; dispatch processor PWB 70-9 having dispatch processors 88, 89 for controlling transmission of data to and from printer section 8; and boot control-arbitration-scheduler PWB 70-10.

Referring to FIG. 6, there is an electronic document processing system 128 for illustrating a preferred environment of the above-described print engine of FIG. 2. The document processing system 128 includes the system control 54, the system control 54 including processors 130 (including the various processors shown in FIGS. 3-5) with the mass memory 56 and the system memory 61. The document processing system 128 further includes an input section 4 for providing a job written in a printer page description language (PDL), and the printer 8 for printing hardcopy renderings of selected image components obtained from the PDL. Furthermore, there is a user interface 52 for enabling a user to interact with the processors 130, the input section 4, and the printer.

As will be understood, the user interface 52, collectively, represents the input devices through which the user enters image editing and manipulation instructions for the processors 130. Additionally, the interface 52 represents the output devices through which the user receives feedback with respect to the actions that are taken in response to the instructions that are entered by the user or otherwise, such as under program control. For example, the user interface 52 generally includes the keyboard 64 (FIG. 1) or the like for entering use instructions, a monitor for giving the user a view of the process that is being performed by a selected one of the processors 130, and a cursor controller for enabling the user to move a cursor for making selections from and/or for entering data into a process that is being displayed by the monitor.

The illustrated document processing system 128 is centralized, so it has been simplified by assuming that all control instructions and all image editing and manipulation instructions are executed by the processors 130 under program control. In practice, however, the execution of these instructions may be handled by several different processors, some or all of which may have their own system memory and even their own mass memory. Likewise, either or both of the input section 4 and the printer may have their own respective user interface, as indicated by the dashed lines 132 and 134, respectively. Indeed, it will be evident that the document processing system 128 could be reconfigured to have a distributed architecture to operate with a remote input section and/or a remote printer (not shown). Data could be transferred from and to such remote input section and printer terminals via dedicated communication links or switched communication networks (also not shown).

In the preferred embodiment, the input section 4 communicates with a remote client, such as a workstation 138 by way of a network 140. Further details regarding network printing arrangements may be obtained by reference to the following references, the pertinent portions of which are incorporated herein: U.S. Pat. No. 5,129,639 to DeHority, U.S. Pat. No. 5,226,112 to Mensing et al. and U.S. patent application Ser. No. 07/898,761 ("'761 Application") entitled "Apparatus and Method for Multi-Stage/Multi-Process Decomposing", filed Jun. 12, 1993, by Bonk et al.

Referring to FIG. 7, the processors 130 preferably include a PDL driver 142 for transferring to the printer PDL descriptions of the electronic document files that are selected for printing. Thus, the printer 8 is illustrated as having a PDL decomposer 144 for decomposing such PDL descriptions to produce corresponding bitmapped image file. It will be appreciated, particularly in view of the discussion in the '761 Application, that the decomposer 144 is capable of receiving PDL files from mass memory, such as disk, or from off the network on the fly. A functional implementation of the PDL decomposer 144, a preferred embodiment of which is described in detail in the '761 Application, resides in the DocuTech® Printing System manufactured by Xerox® Corporation.

Referring to FIG. 8, a print subsystem for the printing system 2 is designated by the numeral 150. Preferably, the Print Subsystem 150 includes a Print File 152 and a System Control Block 154, the system control block including a job database, a front end, a system state controller, a streaming controller and a translator. As shown, the Print Subsystem 150 functions as a "pipeline" with a production section, designated by the numeral 156, and a consumption section, designated by the numeral 158. The production section 156 includes a PDL Fragments Generator ("PDL Frags Gen") 160, a Postparser 162 and a Signature Utility 164. As discussed in the '761 Application, internal PDL fragments ("PDL Frags") represent higher level primitives to be imaged on a substrate. In turn, the PDL Frags Gen 160 is adapted to access an Internal PDL Frags Storage Section in the mass memory 56 (FIG. 6) for generating PDL Frags stored therein. When the printing system 2 is operated as a network printing system, the PDL Frags Gen 160 streams stored PDL Frags to the Postparser 162. When, on the other hand, the source of image data for a job is from the scanner 6 (FIG. 2), the PDL Frags Gen provides tokens to the Postparser 162 for scanned images, the tokens indicating where each scanned image should be placed on a page. Control of both the PDL Frags Generator 160 and the Postparser 162 by the System Control Block 154 is accomplished by use of a Postparse Scheduler 165.

The consumption section 158 includes a Resource Manager 168, a Marker 170 and an Image Output Terminal ("IOT") 172. The relationship of the Resource Manager, Marker and IOT is explained in considerable detail in U.S. patent application Ser. No. 07/010,104 ("'104 Application) entitled "Apparatus and Method for Managing Memory in a Printing System", filed by Hammer et al., on Jan. 28, 1993, the pertinent portions of which are incorporated herein. Control of the Marker 170 by the System Control Block is accomplished by use of a Mark Scheduler 174. The Print File 152 communicates with the production section and the consumption by way of a Print Manager 176, which Print Manager, as explained in further detail below, serves to arbitrate access of the production and consumption sections relative to the Print File.

Referring to FIGS. 8 and 9A, the operation of the print subsystem 150, in what may be referred to as the "performance mode", will be explained. Preferably, the performance mode is composed of two stages, namely the format stage and the marking stage, with the Print File 152 supplying the storage facility for an intermediate format of a print job. Preferably, the intermediate format includes image-related data that can be read ("consumed") by the Marker 170 for generating electronic pages to be used by the IOT 172 in producing corresponding prints. The Postparser 162 makes a single pass over the job for generating each page's real time imaging command and data description list (bandslists) into the Print File 152. Essentially, each bandslist includes pointer offsets indicating where certain image components for a given page, such as rasters, fonts and PDL Frags, reside in the mass memory 56. In FIG. 9A the image-related data (also referred to herein as "print-related information") for the pages of the job is shown as being contained in respective format pages (hereinafter referred to simply as "pages"). It should be recognized that while each page in FIG. 9A is shown as being uniform in length, the length of each format page will, in practice, vary as a function of, among other factors, document page complexity.

As the Print File 152 is filled up, through the coordinated efforts of the System Control Block 154 and the other components of the production section 156, the Marker 170 uses the Print File 152 to generate a print ready image of each page and as many copies of the job as may be required by an operator. Employment of the above-mentioned intermediate format, i.e. image-related data, permits the printing system to employ image generation hardware, of the type described in U.S. Pat. No. 5,216,754, to optimize performance of the printing system. Further detailed description regarding the process is provided in the '104 Application.

Referring to FIG. 9B, due to the complexity and/or size of a given job, the Print File 152 may not possess the capacity to hold all of the image-related data of the given job. In the example of FIG. 9B, the size of the job extends beyond I format pages. In the past, under the circumstances of FIG. 9B, the job had to be aborted, but in what is referred to herein as a "recycle mode", the job of FIG. 9B can be printed, notwithstanding its size. Referring to FIG. 9C, 10 and 11, the various steps of the recycle mode are discussed. While the method of FIGS. 10 and 11 are only directed to the printing of one document set, it will be understood that multiple sets can be obtained with this method by simply repeating the steps of the method for as many sets as are desired.

Referring specifically to FIGS. 8 and 10, once it is determined that a job is to be printed by the Print Subsystem 150, the method is started in the performance mode and pages are delivered to the Print File 152. If the pages to be delivered are normal pages (e.g. 8.5×11 pages) (step 180), then the Postparse Scheduler 165, at step 182, causes the normal pages to be delivered to the Postparser 162 (steps 182, 186). If the pages are special, e.g. the pages are for a signature job, then the Postparse Scheduler causes special pages, such as composite pages for a signature job, to be delivered to the Postparser 162 (steps 184, 186). As pages are delivered to the Print File 152, the System Control Block 154 determines, at step 188, whether a predetermined page threshold has been met. It has been found that, under certain circumstances setting a threshold in this manner optimizes marking by permitting the Production Section 156 to gain a lead on the Consumption Section 158. Once the threshold is met (step 190), marking of the pages proceeds. Assuming that the job can be processed without exceeding the space constraints of the Print File, i.e. the job can be processed strictly in the performance mode, the process proceeds through states 194, 196 and 198 until a positive answer is obtained at decision state 196.

If the Postparser 162 is able to produce image-related data faster than the Marker 170 can consume it, and the Print File 152 reaches a full state, then, at step 200, production of image-related data is halted. In the meantime, beginning with step 202, the Print Subsystem 150 begins processing the job in accordance with the recycle mode. More particularly, a preselected number of pages is consumed until a consumption threshold is met and a positive answer is obtained from the decision state 204. Referring to FIG. 9C, steps 202 and 204 are accomplished by first consuming portion 206 of the Print File 152, which portion 206 may be greater or less than half of the Print File 152. As soon as the portion 206 is consumed, the Print File 152, which in one example is a buffer formed from disk memory, i.e. mass memory 56, is partitioned into two buffers (step 208), namely the portion or buffer 206 and a buffer 210. At this time, the process, in one exemplary mode, is split into two symmetrical halves 212, 214 (FIG. 9C, 11 and 12), which halves permit the two buffers to function as a "ping-pong" buffer set.

Referring to half 212 first (FIG. 11), the buffer 206 (hereinafter referred to as "first buffer"), which was emptied out as a result of steps 202 and 204, is filled up, by the Postparser 162, with pages (step 214) until it is decided, at step 216, that the first buffer is full. If the document is complete (step 218), then the method ends; otherwise, the second buffer is notified (step 220) that consumable pages are available in the Print File. At steps 222 and 224, the Postparser is prevented from writing further information about the job to buffer 210 (hereinafter referred to as "second buffer") until second buffer is available, i.e. until the second buffer is empty.

In the meantime, referring to half 214 (FIG. 12), as the first buffer is being filled up, pages in the second buffer are, via step 228, being consumed by the Marker 170. Once all of the pages in the second buffer have been consumed (step 230), if the document is complete (step 232), then the method ends; otherwise, the first buffer is notified (step 234) that the second buffer is ready to receive more pages. At steps 236 and 238, the Marker is prevented from reading pages from the first buffer until the second buffer has received notice from the first buffer that it is full.

Referring again to half 212 (FIG. 11), upon receiving notice from the second buffer that it is available (step 224), the Postparser 162 fills the second buffer via steps 240 and 242. Provided the document is not complete (step 244), the first buffer is notified that the second buffer is full (step 246) and the Postparser 162 waits (step 248) until the first buffer is available (step 250). As soon as the first buffer is empty, the method loops back to step 214 where some or all of the steps of half 212 are executed (possibly multiple times) until all of the pages associated with the document set are written into the Print File 152 by the Postparser 162.

Referring again to half 214 (FIG. 12), upon receiving notice from the first buffer that it is available (step 238), the Marker 170 empties the second buffer via steps 254 and 256. Provided the document is not complete (step 258), the second buffer is notified that the first buffer is empty (step 260) and the Marker 170 waits (step 262) until the first buffer is available (step 264). As soon as the second buffer is full, the method loops back to step 228 where some or all of the steps of half 214 are executed (possibly multiple times) until all of the pages associated with the document set are consumed by the Marker 170.

There are two levels of control built into the Print Subsystem 150 to implement the above-described two buffer recirculating print file mechanism. At the lowest level, the Print File Manager 176 (FIGS. 8 and 9C) manages producer and consumer access to the Print File 152, i.e. the Print File Manager arbitrates access to the two buffers 206 and 210. At a system manager level, the streaming controller of the System Control Block 154 implements notification procedures relative to the Marker 170, including the ability to handle the Marker overtaking the Postparser 162 at the partition or boundary of the two buffers. In one example, if the consumer (Marker) overtakes the producer (Postparser) then the Marker "dries up" and the IOT 172 cycles down. Consumption is resumed after a selected amount of information has been written, by the Postparser, into the Print File 152. In another example, when the producer overtakes the consumer, the Postparser 162 is throttled, by the Print File Manager 176, until a selected amount of consumption has occurred.

Certain jobs cannot be completed upon the occurrence of a fault, notwithstanding the clearance of the fault. One example of this can occur in a bindexer finishing device, of the type used in the DocuTech® printing system, where an entire set in the bindexer can be lost as a result of one or more sheets jamming. Under these circumstances, the job must be read again by the Marker, starting at a previously read page of the job. In the performance mode, this requirement can be met readily since resetting the marking process is merely a matter of returning to a selected page in the Print File 152. In the recycle mode, however, there is no guarantee that the page required to recover the job will still be in the Print File. Thus, it is desirable to provide a reset procedure that returns the recycle mode to a previous state when a job must be "scrapped" due to a fault.

Referring to FIGS. 13A–13D and 14, an explanation of a reset procedure for use with the recycle mode is shown. In one example (FIG. 13A) the job requires that N sets of eight relatively complex pages be finished with the bindexer. As shown in FIG. 13B, only 7 of the pages of a first set of the eight pages can be written into the Print File 152. Accordingly, the recycle mode is employed and the first four pages of the first set are consumed prior to the establishment of a partition. Subsequently, the eighth page of the first set is written into buffer 206 (FIG. 13C) while three pages of a second set are also written into the buffer 206. While pages are being written into the buffer 206, some pages are consumed from the buffer 210. In the example of FIGS. 13A–13D, a fault, which results in a loss of the set in process, occurs while pages 1-5 through 1-7 are being consumed. Consequently, the pipeline, in accordance with the preferred reset procedure, is "backed up" (FIG. 13D) and pages 1-1 through 1-7 rewritten into the Print File 152.

Referring specifically to FIG. 14, the reset procedure is shown in further detail. Initially, the IOT 172 indicates that a fault condition has occurred. In the illustrated example of FIG. 14, the fault condition is represented by step 268 in which the IOT indicates that it needs to recover a page (or pages) due to a jam. In turn, the Marker 170, at step 270, requests that the Print File Manager 176 provide the missing page. Accordingly, the Print File Manager checks to see if the missing page is in the Print File 152. When the Print Subsystem 150 is in the performance mode, then the process will either proceed from step 272 to step 274, to recover the desired page in the Print File 152, or loop through steps 272, 276 and 278 until the page can be recovered from the Print File. Assuming that the missing page cannot be recovered due to, for example, a situation such as that shown in FIG. 12B–12D, then the process, at step 276, will be directed into the reset procedure of steps 282, 284 and 286. At step 282, the Marker 172 (FIG. 8) indicates to the streaming controller of the System Control Block 154, by way of the Mark Scheduler 174, that a reset is required so that the streaming controller directs the Postparse Scheduler 165 to halt production (step 284). In essence, the Marker and the streaming controller work together to "stop the head of the pipeline". In turn, the pipeline is "cleared out" at step 286 in that the PDL Frags Gen 160, Postparser 162, Postparse Scheduler 165 and Print File Manager 176 function cooperatively to cause the Print Subsystem 150 to "back up to the missing page". In turn, the process is repeated to create the set for which the fault condition occurred.

Referring to FIGS. 8 and 15A–15D, another embodiment of recycle mode operation is discussed. Preferably, in the embodiment of recycle mode operation illustrated by FIGS. 15A–15D, the print file 152 is configured in mass memory 56 as a circular buffer, the circular buffer being designated with the numeral 152'. Referring specifically to FIG. 15A, image-related data for a first job page is written, with the Postparser 162, into a section designated with the numeral "1". Once a selected quantity of image-related data is written into the print file 152', the Marker 170 begins consuming the same. In the illustrated embodiment of FIG. 15A, consumed data is designated by the numeral 300 and the image-related data for first page ("first page") is written into the circular buffer 152' before consumption is commenced. For the example of FIGS. 15A–15C the first page ends at the boundary 302.

Referring to FIG. 15B, the first page is consumed while a second page, designated with the numeral "2", is written into the circular buffer. After the Marker 170 consumes the first page, the Print File Manager 176 checks to determine if the Postparser 162 is leading the Marker 170 by a sufficient amount of image-related data. In preferred mode of operation, the lead is maintained by at least a page. In FIG. 15B, the end of the second page is designated by the boundary 304. Since, in the example of FIG. 1, consumption of the first page ends prior to production of the second page, the Marker 170 is prohibited, temporarily, from reading image-related data from the Print File 152' and the IOT 172 is cycled down. As soon as production of the second page is complete (FIG. 15C), the Print File Manager 176 indicates to the Marker 170 that it can commence reading the second page. In turn, consumption resumes and the IOT is cycled up.

Referring to FIGS. 8 and 16, the operational mode illustrated by FIGS. 15A–15C is shown in a flow diagram. Initially, at step 308 a first page is produced and, at step 310, consumption of the page is commenced. Consumption resumes (steps 312 and 314) until the first page is consumed. At step 316, the Marker 170 seeks access to the Print File 152' through the Print File Manger 176. If the end of the document has been reached, then the process is completed at "END". If a partial page remains for consumption, then the process proceeds through steps 318 and 320, thus inhibiting the Production Section 158 until a full page has been produced. As soon as a full page is produced, then the process proceeds to step 324. It should be appreciated that the lead between the Postparser 162 and Marker 170 could be maintained at less or greater than a page, without affecting the concept upon which the presently disclosed embodiment of recycle mode operation is based, and that step 324 is not required if the Marker is not inhibited at step 320.

It is conceivable that the Postparser 162 can gain an undesirable lead on the Marker 170 and cause fresh image-related data to be written over previously unconsumed data. To avoid this situation, the Print File Manager 176 can periodically compare the amount of data produced for the Print File with the amount of data consumed in the Print File. If the difference becomes to great, the Print File Manager can "throttle" the Postparser 162 for a suitable time period so that the lead can be trimmed appropriately.

The buffering arrangement of FIGS. 15A–15C can be viewed as a "racetrack" arrangement because consumption, for all intents and purposes, "chases" production. One desirable feature of the racetrack arrangement is illustrated by FIG. 15D. In particular, the racetrack, initially is defined by a start/finish boundary 328. Accordingly, page 1 begins at the boundary, and subsequent pages are written into the buffer 152' ("racetrack"). As pages are written into the racetrack, page 1 is consumed. Consequently, page 6 can be written into part of the memory space occupied by page 1 so that the boundary 306 can be essentially shifted forward to 328'. In other words, the racetrack does not require the use of a fixed boundary between a print file producing portion and a print file consuming portion.

As mentioned above, the image-related data preferably includes a first type of data, indicating where image data for selected pages are located in memory (PIDs) and a second type of data describing how each image is to be placed on a print media sheet (PDEs). In one example, (FIG. 17A), the Print File 152' is filled with a block 330 of PDEs for a selected number of pages and blocks of PIDs for the selected number of pages, the blocks of PIDs being designated, respectively, with page numbers, namely "1", "2", "3" and so on. While this approach creates a certain amount of "fragmentation", recycle mode operation proceeds smoothly provided the PDE(s) and PID(s) for each page are consumed in substantially the same amount of time. In one example, however, the amount of memory space required to store a PDE for a given page is considerably less than the amount of memory space required to store the PIDs corresponding with the same page. As illustrated by FIGS. 17B and 17C, this space disproportionality can lead to further fragmentation when the PDEs, for a relatively oversized job, are consumed at a rate which is considerably less than the rate at which the PIDs are consumed. In particular, for the buffer 152' of FIG. 17B, certain memory space cannot be allocated due to the amount of space occupied by the PIDs for page 8, and for the buffer of FIG. 17C, certain memory space cannot be allocated due to the amount of space occupied by the PIDs for page 11.

Referring to FIG. 18, a technique which alleviates fragmentation altogether is shown. In the illustrated embodiment of FIG. 18, the Print File 152' is divided into a first circular buffer 152'-1 and a second circular buffer 152'-2. With this approach the PIDs for each page of a job are stored sequentially in the first circular buffer 152'-1, while the PDEs, for the corresponding job are stored sequentially in one of a plurality of allocated blocks 332-1, 332-2 or 332-3 of second circular buffer 152'-2. Preferably, for each page of the job, a reference, such as a pointer, is used to link a PDE with one or more corresponding PIDs. In the illustrated example of FIG. 18, the first PDE in block 332-1 is referenced with the corresponding PIDs of job page 1 by way of a pointer 334. In operation, to mark the first page, the first PDE, with its corresponding pointer, is passed along to the Marker 170, and, in turn, the information provided by the PDE, along with the PID information which can be accessed by reference to the pointer 334, is used to print the first page with the IOT 172. Since the PDEs tend to occupy less memory space than the PIDs, the amount of memory allocated to the buffer 152'-2 can be considerably less than the amount of memory allocated to the buffer 152'-1.

Numerous features of the disclosed embodiment will be appreciated by those skilled in the art:

One feature of the disclosed embodiment resides in a racetrack arrangement ("racetrack") which lends flexibility to recycle mode operation. In particular, relatively oversized jobs can be printed in a single circular buffer without a partition. Since the circular buffer of the race track has neither a beginning nor an end, image-related data can, in many circumstances, be written into the racetrack without concern regarding the beginning or end of the buffer. Moreover, through use of a print file manager, production and consumption of image-related data in the racetrack can be managed in an orderly and efficient manner.

Another feature of the invention resides in the use of a two buffer print file arrangement to alleviate data fragmentation. In particular, by placing PIDs in a first buffer and PDEs in a second buffer, image related data processing can be optimized for recycle mode operation. Moreover, reading of the PDEs and the PIDs is synchronized since the PDEs are linked with the PIDs through use of pointers, and only the PDEs need be passed to the marker for purposes of producing prints. Finally, memory space utilization is optimized since buffer space allocation can be customized for actual space requirements of the PDEs and PIDs.

What is claimed is:

1. A method of printing a job to produce a set of prints in a printing system with a print file, the job being characterized by a plurality of pages, with each page being represented by image data stored at selected locations in one or more memory files, the print file being divided into a first buffer and a second buffer where the print file communicates with a marker, the marker employing a set of a first type of print-related information and a set of a second type of print-related information for facilitating the production of the set of prints, comprising the steps of:

generating the set of the first type of print-related information with references to the selected locations of the image data in the one or more memory files;

filling the first buffer with a first portion of the set of the first type of print-related information and the second buffer with the a first portion of the set of the second type of print-related information;

reading, with the marker, the first portion of the set of the first type of print-related information from the first buffer and the first portion of the set of the second type of print-related information from the second buffer; and filling the first buffer with a second portion of the set of the first type of print-related information when all of the first portion of the set of the first type of print-related information has been read by the marker.

2. The method of claim 1, further comprising the step of filling the second buffer with a second portion of the set of the second type of print-related information when all of the first portion of the set of the second type of print-related information has been read by the marker.

3. The method of claim 1, further comprising comprising the step of allocating a block of the second buffer for receiving the first portion of the set of the second type of print-related information prior to said first filling step.

4. The method of claim 1, further comprising the step of allocating substantially more memory space to the first buffer than to the second buffer.

5. The method of claim 1, further comprising the step of configuring the first buffer and the second buffer as a first circular buffer and a second circular buffer, respectively.

6. The method of claim 1, further comprising the step of corresponding a location in the first buffer with a location in the second buffer, by way of a reference, so that a subset of the set of the first type of print-related information is operatively coupled with a subset of the set of the second type of print-related information.

7. The method of claim 6, further comprising the step of producing a print by delivering the subset of the set of the second type of print-related information to the marker and accessing the print-related information of the subset of the set of the first type of print-related information with the reference.

8. The method of claim 1, in which a print-related information generating source and the marker each access the first buffer and the second buffer for performing a selected one of the first filling step, the second filling step and the reading step, further comprising the step of arbitrating intervals during which the print-related information generating source and the marker access the first buffer and the second buffer.

9. A method of printing a job to produce a set of prints in a printing system with a print file, each print in the set of prints being disposed on a print media sheet and the job being characterized by a plurality of pages with each page having an image disposed thereon, the print file being divided into a first buffer and a second buffer where the print file communicates with a marker, the marker employing a set of a first type of print-related information and a set of a second type of print-related information for facilitating the production of the set of prints, comprising the steps of:
   generating the set of the second type of print-related information by indicating how each image is to be disposed on a corresponding one of the print media sheets;
   filling the first buffer with a first portion of the set of the first type of print-related information and the second buffer with the a first portion of the set of the second type of print-related information;
   reading, with the marker, the first portion of the set of the first type of print-related information from the first buffer and the first portion of the set of the second type of print-related information from the second buffer; and
   filling the first buffer with a second portion of the set of the first type of print-related information when all of the first portion of the set of the first type of print-related information has been read by the marker.

10. The method of claim 9, further comprising the step of filling the second buffer with a second portion of the set of the second type of print-related information when all of the first portion of the set of the second type of print-related information has been read by the marker.

11. The method of claim 9, further comprising comprising the step of allocating a block of the second buffer for receiving the first portion of the set of the second type of print-related information prior to said first filling step.

12. The method of claim 9, further comprising the step of allocating substantially more memory space to the first buffer than to the second buffer.

13. The method of claim 9, further comprising the step of configuring the first buffer and the second buffer as a first circular buffer and a second circular buffer, respectively.

14. The method of claim 9, further comprising the step of corresponding a location in the first buffer with a location in the second buffer, by way of a reference, so that a subset of the set of the first type of print-related information is operatively coupled with a subset of the set of the second type of print-related information.

15. The method of claim 14, further comprising the step of producing a print by delivering the subset of the set of the second type of print-related information to the marker and accessing the print-related information of the subset of the set of the first type of print-related information with the reference.

16. The method of claim 9, in which a print-related information generating source and the marker each access the first buffer and the second buffer for performing a selected one of the first filling step, the second filling step and the reading step, further comprising the step of arbitrating intervals during which the print-related information generating source and the marker access the first buffer and the second buffer.

17. A printing system for producing a set of prints from a job with a plurality of pages, each page being represented by image data stored at selected locations in one or more memory files, comprising:
   a print file including,
      a first buffer filled with a first portion of a first type of print related information, the first type of print related information including references to the selected locations of the image data in the one or more memory files, and
      a second buffer filled with a first portion of a second type of print related information;
   a marking service facilitating the production of the set of prints with both the first type of print related information and the second type of print related information;
   said marking service reading the first portion of the set of the first type of print-related information from the first buffer and the first portion of the set of the second type of print-related information from the second buffer; and
   said first buffer being filled with a second portion of the set of the first type of print-related information when all of the first portion of the set of the first type of print-related information has been read by said marking service.

18. The printing system of claim 17, further comprising a memory section, said memory section including said first buffer and said second buffer.

19. The printing system of claim 17, wherein substantially more memory space is allocated to said first buffer than to said second buffer.

20. The printing system of claim 17, wherein a location in said first buffer is corresponded with a location in said second buffer, by way of a reference, so that a subset of the set of the first type of print-related information is operatively coupled with a subset of the set of the second type of print-related information.

21. The printing system of claim 20, wherein a print is produced by delivering the subset of the set of the second type of print-related information to the marker and accessing the print-related information of the subset of the set of the first type of print-related information with the reference.

22. The printing system of claim 17, further comprising:
- a print-related information generating source for generating both the first type of print-related information and the second type of print-related information, said print-related information generating source being adapted to access said print file for writing print-related information in said print file and said marking service being adapted to access said print file for reading print-related information from said print file; and
- an apparatus for arbitrating when a selected one of said print-related information generating source and said marking service accesses said print file.

23. A printing system for producing a set of prints from a job with a plurality of pages, each print of the job being disposed respectively on a print media sheet and including a representation of an image, comprising:
- a print file including,
  - a first buffer filled with a first portion of a first type of print related information, and
  - a second buffer filled with a first portion of a second type of print related information, the second type of print related information indicating how each image is to be disposed on a corresponding one of the print media sheets;
- a marking service facilitating the production of the set of prints with both the first type of print related information and the second type of print related information;
- said marking service reading the first portion of the set of the first type of print-related information from the first buffer and the first portion of the set of the second type of print-related information from the second buffer; and
said first buffer being filled with a second portion of the set of the first type of print-related information when all of the first portion of the set of the first type of print-related information has been read by said marking service.

24. The printing system of claim 23, further comprising a memory section, said memory section including said first buffer and said second buffer.

25. The printing system of claim 23, wherein substantially more memory space is allocated to said first buffer than to said second buffer.

26. The printing system of claim 23, wherein a location in said first buffer is corresponded with a location in said second buffer, by way of a reference, so that a subset of the set of the first type of print-related information is operatively coupled with a subset of the set of the second type of print-related information.

27. The printing system of claim 26, wherein a print is produced by delivering the subset of the set of the second type of print-related information to the marker and accessing the print-related information of the subset of the set of the first type of print-related information with the reference.

28. The printing system of claim 23, further comprising:
- a print-related information generating source for generating both the first type of print-related information and the second type of print-related information, said print-related information generating source being adapted to access said print file for writing print-related information in said print file and said marking service being adapted to access said print file for reading print-related information from said print file; and
- an apparatus for arbitrating when a selected one of said print-related information generating source and said marking service accesses said print file.

* * * * *